(No Model.)
C. W. A. KOELKEBECK.
CENTRIFUGAL LIQUID SEPARATOR.
No. 362,449. Patented May 3, 1887.
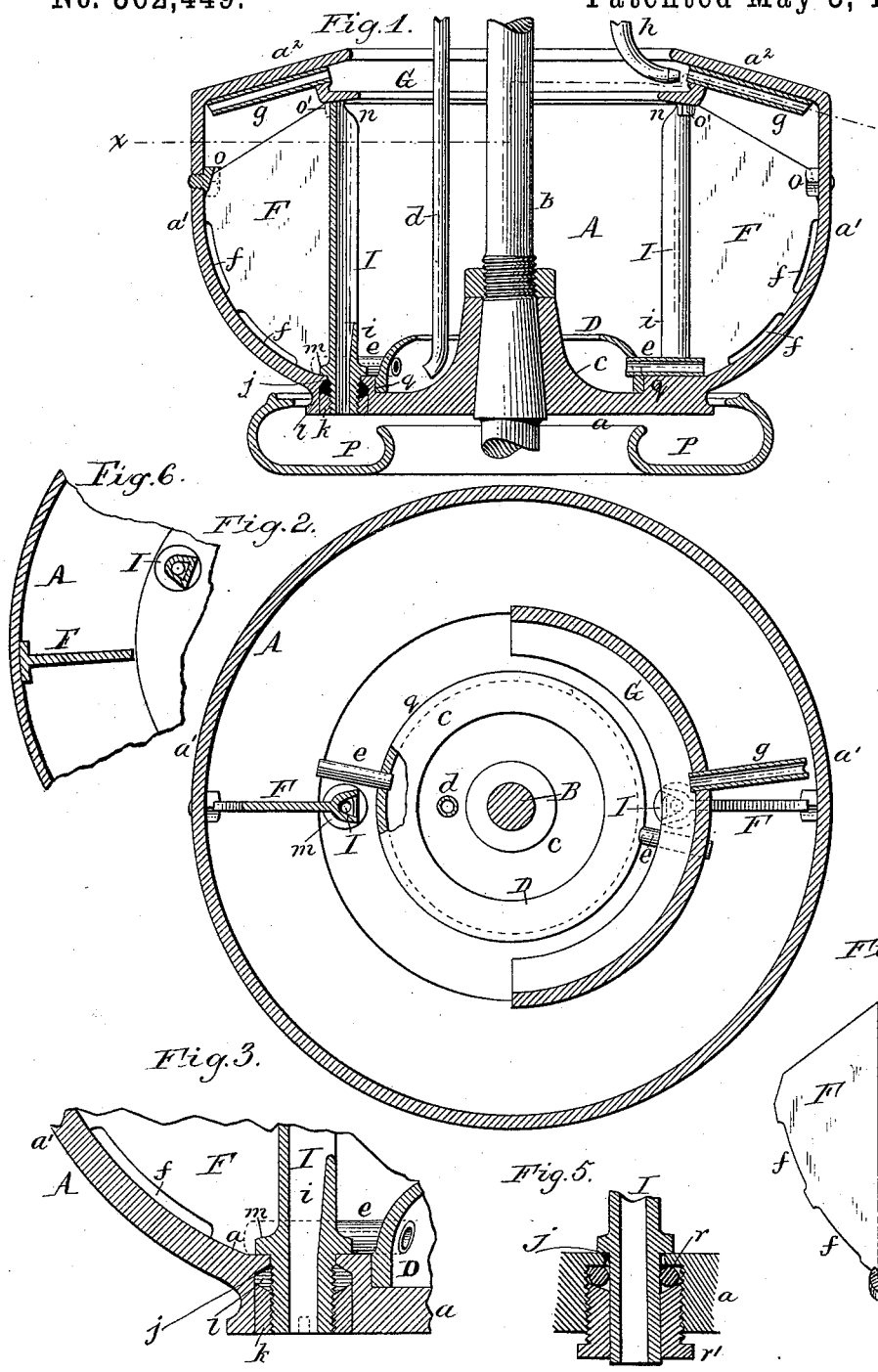

UNITED STATES PATENT OFFICE.

CHARLES W. A. KOELKEBECK, OF CAMDEN, NEW JERSEY, ASSIGNOR TO DAVID H. BURRELL, OF LITTLE FALLS, NEW YORK, AND JONATHAN EVANS, OF PHILADELPHIA, PENNSYLVANIA.

CENTRIFUGAL LIQUID-SEPARATOR.

SPECIFICATION forming part of Letters Patent No. 362,449, dated May 3, 1887.

Application filed March 10, 1886. Serial No. 194,704. (No model.)

*To all whom it may concern:*

Be it known that I, CHARLES W. A. KOELKEBECK, of Camden, in the county of Camden and State of New Jersey, have invented a new and useful Improvement in Centrifugal Liquid-Separators, of which the following is a specification.

This invention relates to an improvement in that class of centrifugal separators which are employed for separating compound liquids into their constituent liquids of different specific gravities—for instance, for separating full milk into cream and skim-milk.

The object of this invention is to improve the devices whereby the flow of the liquids through and from the centrifugal separator is controlled; and my invention consists to that end of the improvements, which will be hereinafter fully set forth, and pointed out in the claims.

In the accompanying drawings, Figure 1 is a sectional elevation of the separating-drum of a centrifugal separator provided with my improvements. Fig. 2 is a longitudinal section in line $x$ $x$, Fig. 1. Fig. 3 is a sectional elevation of the lower portion of the drum and one of the cream-conduits on an enlarged scale. Fig. 4 is a perspective view of one of the cream conduits and blades. Fig. 5 is a sectional elevation showing a modified construction of the device whereby the cream-conduit is secured to the drum. Fig. 6 is a fragmentary horizontal section of the drum, showing a modified arrangement of the blade and cream-discharge.

Like letters of reference refer to like parts in the several figures.

A represents the separating-drum, composed of a tight bottom, $a$, and imperforate peripheral wall $a'$, and an inwardly-projecting top flange, $a^2$.

B represents the spindle, to which the drum is secured in any suitable manner. As shown in the drawings, the bottom $a$ is provided with an upwardly-projecting central hub, $c$, which is secured to the spindle B.

$d$ is the feed-pipe, through which the full milk is fed upon the bottom $a$, near the hub $c$. D is an annular cup or ring, which rests upon the bottom $a$ and surrounds the hub $c$. The feed-pipe $d$ discharges the full milk into the cup D, and the latter is provided with horizontal discharge-pipes $e$, which carry the milk to the outer wall of the drum and prevent it from disturbing the ring or annular layer of cream which collects on the inner surface of the ring of milk in the drum.

F represents the vertical blades, which are secured in the drum, and which compel the liquid to rotate with the same.

$f$ represents notches or openings formed in the blades F adjacent to the outer wall of the drum for the purpose of permitting the milk to distribute itself over the inner surface of the wall of the drum.

G represents the annular trough, which is formed at the inner edge of the top flange, $a^2$, and which receives the skim-milk from the outer portion of the drum through pipes $g$.

$h$ represents the skimming-pipe, which receives the skim-milk from the annular trough G.

I represents upright cream-conduits, which may be arranged at the inner edges of the blades F, and cast in one piece therewith. The upper portions of these conduits are made trough-shaped and open toward the axis of the drum, while the lower portions of said conduits are tubular and form nozzles $i$, which project downwardly through openings $j$, formed in the bottom $a$ of the drum. The nozzles $i$ are screw-threaded externally, and are secured to the bottom of the drum by countersunk screw-nuts $k$. Washers $l$, of rubber or other suitable material, are preferably arranged between the nuts $k$ and the lower side of the bottom $a$, in the recesses of the bottom $a$, in which the nuts are arranged. The nozzles $i$ are provided with collars $m$, which bear against the upper side of the bottom $a$, so that by tightening the nuts $k$ the conduits I and the blades F are firmly secured to the bottom of the drum, when the blades are secured to the cream conduits.

$n$ represents notches formed in the upper ends of the conduits I, for admitting the cream to the same, the side walls of the trough-shaped conduits projecting inwardly beyond the inner surface of the ring of cream, so that the cream is taken from the upper portion of the drum, where the separation of the cream from the skim-milk is most complete.

The blades F are held in position at their upper outer corners by entering a slot in the head of screws $o$, which are secured to the drum, and whereby the blades are held against lateral displacement. The blades are held at their upper inner corners between lips $o'$, formed on the under side of the annular trough G. These supports, in connection with the fastening at the lower end of the cream-conduit, serve to secure each blade firmly in place. If desired, however, the blades may be provided with lugs or ears, whereby they are secured to the peripheral wall of the drum.

The cream-conduits I may be made separate from the blades F, and may be secured thereto by soldering or brazing; or the cream-conduits may be detached from the blades and be placed in different parts of the drum—for instance, a quarter-turn removed from the blades, as represented in Fig. 6. In the latter case the blades are secured to the drum and the skim-milk trough G in any usual manner.

If desired, the cream-conduits may be secured to the bottom of the drum by a yielding joint, as represented in Fig. 5. In this case the nozzle of the conduit, which passes through the opening $j$ in the bottom, is smaller in diameter than said opening, and the nozzle is clamped in place by a packing-ring, $r$, which is forced against the nozzle by a nut or gland, $r'$. The latter is screwed into the lower enlarged portion of the opening $j$.

The full milk entering the cup D from the feed-pipe $d$ passes through the pipes $e$ toward the peripheral wall of the drum, and then rises along said wall and is separated by the centrifugal force into cream and skim-milk. The latter passes through the pipes $g$ into the annular trough G, from which it is removed by the skimming-pipe $h$. The separated cream enters the upper end of the cream-conduit I through the notch $n$, descends in the conduit, and escapes from the lower end thereof into a receiving-trough, P. The lower tubular portion of the cream-conduit conducts the separated cream through the body of milk and cream on the bottom of the drum, which body is in the incipient stage of separation and must not come in contact with the separated cream.

Upon releasing the screw-nuts $k$ the blades I can be removed from the drum, and the latter and the blades and their cream-conduits be thoroughly cleaned. The cup D rests loosely against an annular shoulder, $q$, on the bottom of the drum, and can also be readily removed and cleaned when required.

The cream descends in the conduits I by gravity, and is therefore not frothy like cream which is removed from the drum by skimming or by being thrown out by centrifugal force. The drum composed of the bottom $a$, peripheral wall $a'$, top flange, $a^2$, and annular trough G is readily cast complete in one piece, whereby the cost of production is greatly reduced.

The operation of the parts has been described with reference to creaming milk.

If the machine is used for separating a different liquid, the skim-milk discharge removes the heavy separated liquid, and the cream-discharge removes the light separated liquid in the manner described.

I claim as my invention—

1. The combination, with the separating-drum having an opening in its bottom, of a vertical blade secured in the drum, and an upright trough secured along the inner edge of the blade, opening inwardly and terminating at its lower end in a nozzle, which is secured in the opening in the bottom of the drum, substantially as set forth.

2. The combination, with the separating-drum having an opening in its bottom, of a descending conduit, I, terminating at its lower end in a nozzle, $i$, and a screw-nut, whereby said conduit is secured in the bottom of the drum, substantially as set forth.

3. The combination, with the drum having its bottom provided with an annular shoulder, $q$, of a removable annular cup, D, resting loosely on the bottom of the drum and against said shoulder, substantially as set forth.

Witness my hand this 3d day of March, 1886.

CHARLES W. A. KOELKEBECK.

Witnesses:
JONATHAN EVANS,
DARRACH CLEAVER.